(12) United States Patent
Zhou

(10) Patent No.: US 8,917,367 B2
(45) Date of Patent: Dec. 23, 2014

(54) BACKLIGHT MODULE AND LIQUID CRYSTAL DISPLAY

(75) Inventor: Gege Zhou, Shenzhen (CN)

(73) Assignee: Shenzhen China Star Optoelectronics Technology Co., Ltd, Guangdong (CN)

(*) Notice: Subject to any disclaimer, the term of this patent is extended or adjusted under 35 U.S.C. 154(b) by 120 days.

(21) Appl. No.: 13/376,595

(22) PCT Filed: Oct. 12, 2011

(86) PCT No.: PCT/CN2011/080688
§ 371 (c)(1),
(2), (4) Date: Dec. 7, 2011

(87) PCT Pub. No.: WO2013/033941
PCT Pub. Date: Mar. 14, 2013

(65) Prior Publication Data
US 2013/0063680 A1 Mar. 14, 2013

(30) Foreign Application Priority Data

Sep. 9, 2011 (CN) .......................... 2011 1 0267047

(51) Int. Cl.
G02F 1/1335 (2006.01)
G09F 13/04 (2006.01)
G09F 13/18 (2006.01)
F21V 8/00 (2006.01)
F21V 7/04 (2006.01)
G02F 1/1333 (2006.01)

(52) U.S. Cl.
CPC .......... *G09F 13/04* (2013.01); *G02F 1/133608* (2013.01); *G09F 13/18* (2013.01); *G09F 2013/049* (2013.01); *G02F 1/133615* (2013.01); *G02F 2001/133314* (2013.01); *G02F 2001/133328* (2013.01); *G02F 2201/54* (2013.01); *G02B 6/0091* (2013.01)
USPC .............. 349/62; 362/632; 362/633; 362/634

(58) Field of Classification Search
CPC .................................................. G02F 1/133608
USPC ..................................... 349/62; 362/632–634
See application file for complete search history.

(56) References Cited

U.S. PATENT DOCUMENTS

| 5,820,089 | A | * | 10/1998 | Lim | 248/188.8 |
| 6,488,256 | B1 | * | 12/2002 | Chang | 248/670 |
| 8,164,709 | B2 | * | 4/2012 | Chen | 349/65 |
| 2008/0088764 | A1 | * | 4/2008 | Son et al. | 349/58 |
| 2008/0278661 | A1 | * | 11/2008 | Oh | 349/65 |
| 2009/0002601 | A1 | * | 1/2009 | Lee et al. | 349/65 |
| 2009/0268124 | A1 | * | 10/2009 | Kujiraoka et al. | 349/61 |
| 2010/0171900 | A1 | * | 7/2010 | Lee | 349/58 |

* cited by examiner

Primary Examiner — Michael Caley
Assistant Examiner — Edmond Lau

(57) ABSTRACT

A backlight module and a liquid crystal display are provided. The backlight module includes a light guide plate, a source, a first back plate and a second back plate. The first back plate includes a first main body and a first bending portion. The second back plate includes a second main body and a second bending portion. The first main body is slidably connected to the second main body. The light guide plate is fixedly connected to the first main body. A light-emitting surface of the light source is against a light incidence surface of the light guide plate, and another surface of the light guide plate is close to an inner side of the second bending portion. When the light guide plate expands with heat, the expanded light guide plate pushes the second bending portion to make the second back plate slide relative to the first back plate.

16 Claims, 3 Drawing Sheets

BACKLIGHT MODULE AND LIQUID CRYSTAL DISPLAY

BACKGROUND OF THE INVENTION

1. Field of the Invention

The present invention relates to a technology field of liquid crystal display, and more particularly to a backlight module and a liquid crystal display.

2. Description of the Prior Art

With the development of the liquid crystal display technology, the demand for the function of the liquid crystal display becomes more and more high.

FIG. 1 is a partial structural schematic view of a backlight module of the prior art, which includes a light source 11, a light guide plate 12 and a back plate 13. The light source 11 may be a light emitting diode (LED) for emitting light. The light emitted by the light source 11 can enter into the light guide plate 12. The light-coupling efficiency between the light source 11 and the light guide plate 12 directly influences the light use efficiency of the whole backlight module.

In the prior art, the light guide plate 12 is made of the macromolecule material, such as Polymethyl Methacrylate (PMMA), Polycarbonate (PC) and so on. These materials can expand when being heated. Because the light source 11 can generate a quantity of heat when working and the light guide plate 12 is close to the light source 11, the heat is easy to be transmitted unto the light guide plate 12. As a result, the light guide plate 12 will expand. Accordingly, there must form an enough expanding space between the light source 11 and the light guide plate 12, so that providing the enough expanding space for the light guide plate 12.

Please refer to FIGS. 2A and 2B, which respectively show different gaps D1, D2 between the light source 11 and the light guide plate 12 and schematically show different light-leaking proportions of the light source 11. In FIGS. 2A and 2B, the gap D1 is greater than the gap D2. When the gap is D1, the range of the incidence angle of the light emitted by the light source 11 entering into the light guide plate 12 is smaller so that resulting in a greater light-leaking range therefore the light-leaking proportion is greater. When the gap is D2, the range of the incidence angle of the light emitted by the light source 11 entering into the light guide plate 12 is greater so that resulting in a smaller light-leaking range, therefore the light-leaking proportion is smaller. Obviously, because there exists the expanding gap between the light source 11 and the light guide plate 12 and whether the size of the gap is small or greater, the partial light of the light source 11 can be leaked and cannot enter into the light guide plate 12 so that resulting in a low light entry efficiency and reducing the light use efficiency of the backlight module.

For enhancing the light use efficiency of the backlight module, the expanding gap between the light source 11 and the light guide plate 12 needs to be eliminated. Namely, the light source 11 directly contacts the light guide plate 12. But this will result in there being no the expanding space provided for the light guide plate 12. Once the light guide plate 12 expands to some extent, the light guide plate 12 will be bent and deformed or even be cracked so that lowering the image displaying quality of the liquid crystal display.

BRIEF SUMMARY OF THE INVENTION

The present invention provides a backlight module and a liquid crystal display to solve the problems of the light guide plate being cracked and the image displaying quality of the liquid crystal display being lowered because of the light source and the light guide plate being directly contact each other and the expanding space of the light guide plate being eliminated in the prior art.

An object of the present invention is to provide a backlight module, which employs a retractable back plate to make a light incidence surface of a light guide plate safely contact a light-emitting surface of a light source so that ensuring all lights emitted by the light source to enter into the light guide plate, and thereby enhancing the light use efficiency of the backlight module.

Another object of the present invention is to provide a liquid crystal display for enhancing the light use efficiency and improving the image displaying quality.

The other objects and the advantages of the present invention may be further understood from the technical features disclosed by the present invention.

To achieve the aforementioned object or other objects of the present invention, the present invention adopts the following technical solution. A backlight module is provided, comprising a light guide plate and a source. The light guide plate includes a light incidence surface facing the light source, a light exit surface connected to the light incidence surface and a bottom surface opposite to the light exit surface. The light source includes a light-emitting surface. The light emitted by the light source passes through the light incidence surface to enter into the light guide plate.

The backlight module further comprises a first back plate, a second back plate and a retaining member. The first back plate includes a first main body and a first bending portion. The second back plate includes a second main body and a second bending portion. The first bending portion is vertically bent and extends from one end of the first main body.

The first main body is slidably connected to the second main body. The light guide plate is fixedly connected to the first main body by the retaining body. The light source is mounted on an inner side of the first bending portion, and the light-emitting surface of the light source is against the light incidence surface of the light guide plate. Another surface of the light guide plate opposite to the light incidence surface is close to an inner side of the second bending portion.

Wherein when the light guide plate expands with heat, the expanded light guide plate is against the second bending portion and pushes the second bending portion to make the second back plate slide relative to the first back plate.

In the backlight module of the present invention, the first main body is provided with a first through hole, the second main body is provided with a second through hole, the first and second through holes are slip-shaped, and the first through hole is corresponding to the second through hole.

The backlight module also comprises a connection member, which passes through the first through hole and the second through hole to connect the first main body to the second main body.

In the backlight module of the present invention, the connection member includes a bolt and a nut, and the bolt passes through the first through hole and the second through hole to be tightened with the nut.

In the backlight module of the present invention, there forms a recess on a connection position of the first main body and the second main body, and the recess is used to accommodate the bolt or the nut.

In the backlight module of the present invention, the retaining member is coated with the glue, and the retaining member is fixedly connected to the light guide plate and the first main body by the glue.

In the backlight module of the present invention, the second bending portion is vertically bent and extends from one end of the second main body.

To achieve the aforementioned object or other objects of the present invention, the present invention adopts the following technical solution. A backlight module is provided, comprising a light guide plate and a source. The light guide plate includes a light incidence surface facing the light source, a light exit surface connected to the light incidence surface and a bottom surface opposite to the light exit surface. The light source includes a light-emitting surface. The light emitted by the light source passes through the light incidence surface to enter into the light guide plate.

The backlight module further comprises a first back plate and a second back plate. The first back plate includes a first main body and a first bending portion. The second back plate includes a second main body and a second bending portion.

The first main body is slidably connected to the second main body. The light guide plate is fixedly connected to the first main body. The light source is mounted on an inner side of the first bending portion, and the light-emitting surface of the light source is against the light incidence surface of the light guide plate. Another surface of the light guide plate opposite to the light incidence surface is close to an inner side of the second bending portion.

Wherein when the light guide plate expands with heat, the expanded light guide plate is against the second bending portion and pushes the second bending portion to make the second back plate slide relative to the first back plate.

In the backlight module of the present invention, the first main body is provided with a first through hole, the second main body is provided with a second through hole, the first and second through holes are slip-shaped, and the first through hole is corresponding to the second through hole.

The backlight module also comprises a connection member, which passes through the first through hole and the second through hole to connect the first main body to the second main body.

In the backlight module of the present invention, the connection member includes a bolt and a nut, and the bolt passes through the first through hole and the second through hole to be tightened with the nut.

In the backlight module of the present invention, there forms a recess on a connection position of the first main body and the second main body, and the recess is used to accommodate the bolt or the nut.

In the backlight module of the present invention, the second main body is provided with a sliding groove, and the first main body is provided with a slidable rod, wherein the slidable rod is slidably connected to the sliding groove.

In the backlight module of the present invention, the backlight module further comprises a retaining member, which is used to fixedly connect the light guide plate to the first main body.

In the backlight module of the present invention, the retaining member is coated with the glue, and the retaining member is fixedly connected to the light guide plate and the first main body by the glue.

In the backlight module of the present invention, the first bending portion is vertically bent and extends from one end of the first main body, and the second bending portion is vertically bent and extends from one end of the second main body.

To achieve the aforementioned object or other objects of the present invention, the present invention also adopts the following technical solution. A liquid crystal display is provided, comprising a liquid crystal display panel, characterized in that: the liquid crystal display further comprises a backlight module. The backlight module comprises a light guide plate and a source. The light guide plate includes a light incidence surface facing the light source, a light exit surface connected to the light incidence surface and a bottom surface opposite to the light exit surface. The light source includes a light-emitting surface. The light emitted by the light source passes through the light incidence surface to enter into the light guide plate.

The backlight module further comprises a first back plate and a second back plate. The first back plate includes a first main body and a first bending portion. The second back plate includes a second main body and a second bending portion.

The first main body is slidably connected to the second main body. The light guide plate is fixedly connected to the first main body. The light source is mounted on an inner side of the first bending portion, and the light-emitting surface of the light source is against the light incidence surface of the light guide plate. Another surface of the light guide plate opposite to the light incidence surface is close to an inner side of the second bending portion.

Wherein when the light guide plate expands with heat, the expanded light guide plate is against the second bending portion and pushes the second bending portion to make the second back plate slide relative to the first back plate.

Comparing with the prior art, the backlight module and the liquid crystal display of the present invention employ a retractable back plate to make a light incidence surface of a light guide plate safely contact a light-emitting surface of a light source. Therefore, all lights emitted by the light source can be ensured to enter into the light guide plate, thereby enhancing the light use efficiency of the backlight module.

For more clearly and easily understanding above content of the present invention, the following text will take a preferred embodiment of the present invention with reference to the accompanying drawings for detail description as follows.

DETAILED DESCRIPTION OF THE PREFERRED EMBODIMENTS

The following description of every embodiment with reference to the accompanying drawings is used to exemplify a specific embodiment, which may be carried out in the present invention. Directional terms mentioned in the present invention, such as "top", "bottom", "front", "back", "left", "right", "inside", "outside", "side" etc., are only used with reference to the orientation of the accompanying drawings. Therefore, the used directional terms are intended to illustrate, but not to limit, the present invention.

Figure 1:
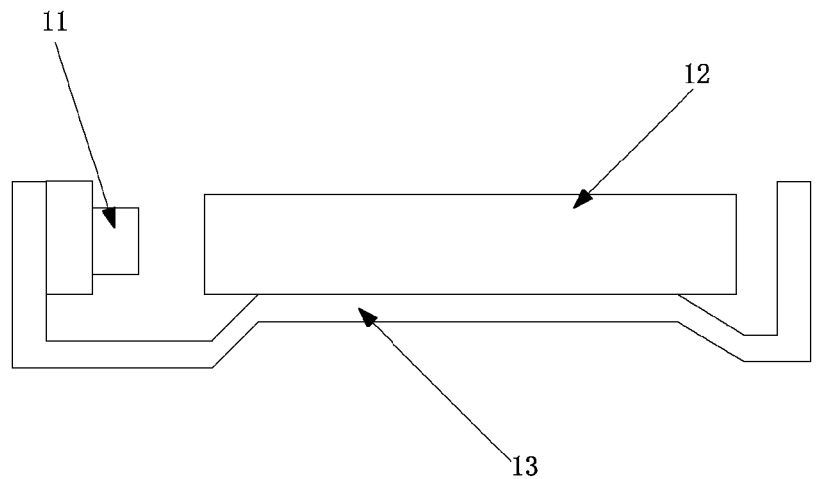
FIG. 1 is a partial structural schematic view of a backlight module in the prior art.
Figure 2A:
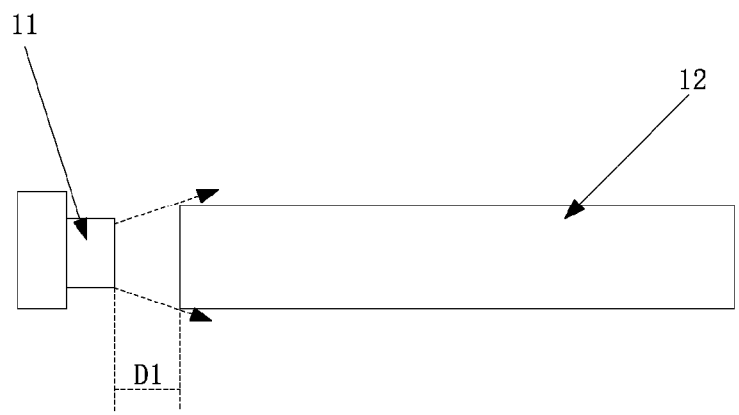
FIGS. 2A and 2B are a contrasting schematic view of different light-leaking proportions when there exists different gaps between a light source and a light guide plate in the prior art.
Figure 2B:
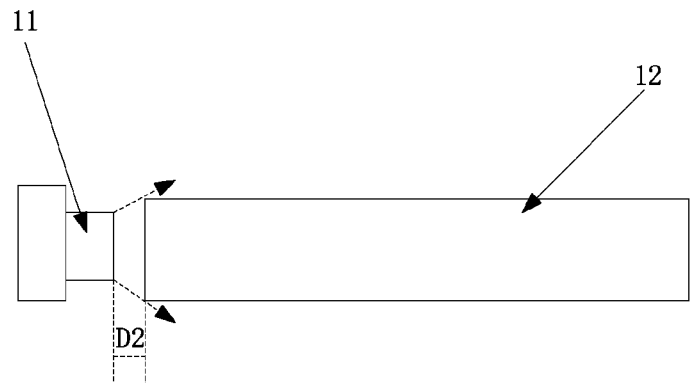
Figure 3:
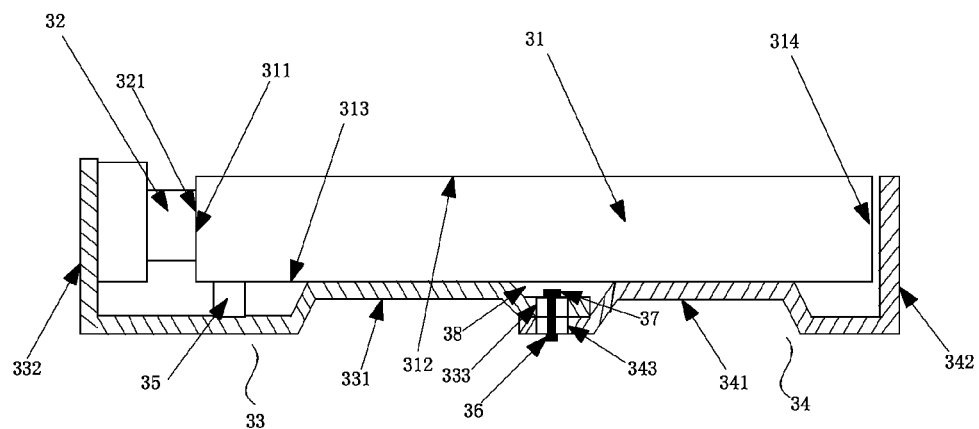
FIG. 3 is a structural view of a preferred embodiment of a backlight module of the present invention.

FIG. 3 is a structural view of a preferred embodiment of a backlight module of the present invention.

The backlight module comprises a light guide plate 31 and a light source 32. The light guide plate 31 extends along a horizontal plane. The light guide plate 31 includes a light incidence surface 311, a light exit surface 312 connected to the light incidence surface 311, and a bottom surface 313 opposite to the light-emitting surface 312.

Please refer to FIG. 3, the light source 32 contacts the light guide plate 31. The light source 32 includes several LEDs (FIG. 4), each of which has a light-emitting surface 321. The light-emitting surface 321 of the light source 32 directly contacts the light incidence surface 311 of the light guide plate 31 so that the light emitted by the light-emitting surface 321 can directly arrive at the light incidence surface 311 of the light guide plate 31.

Please refer to FIG. 3, the backlight module also comprises a first back plate 33 and a second back plate 34. The first back plate 33 includes a first main body 331, a first bending portion 332 and a first through hole 333. The second back plate 34 includes a second main body 341, a second bending portion 342 and a second through hole 343.

Please refer to FIG. 3, both the first main body 331 and the second main body 341 extend along the horizontal plane. The first bending portion 332 is vertically bent upward from one end of the first main body 331, and the second bending portion 342 protrudes upward from one end of the second main body 341.

Please refer to FIG. 3, the light source 32 is located on an inner side of the first bending portion 332. In this embodiment, the light-emitting surface 321 of the light source 32 is against the light incidence surface 311 of the light guide plate 31. Another surface 314 of the light guide plate 31 opposite to the light incidence surface 311 is close to an inner side of the second bending portion 342. Namely, the distance between the another surface 314 of the light guide plate 31 and the inner side of the second bending portion 342 is in an infinitesimal range, such as the range of 0.01 mm to 0.1 mm.

Please refer to FIG. 3, the backlight module also comprises a retaining member 35. The retaining member 35 fixedly connects the light guide plate 31 to the first main body 331. In this embodiment, there only forms a contact between the light guide plate 31 and the second main body 341, but does not form a fixed connection therebetween, so that the first back plate 33 and the second back plate 34 can slide relative to each other.

In the concrete implementation, the light sources may be simultaneously disposed on the inner sides of the first bending portion 332 and the second bending portion 342, but it must be ensured that one of the first back plate 33 and the second back plate 34 is fixedly connected to the light guide plate 31 so that the first back plate 33 and the second back plate 34 can slide relative to each other. The principle thereof is same as that of this embodiment, so it is no more repeated here.

Preferably, the retaining member 35 is coated with the glue. The retaining Member 35 adheres to the light guide plate 31 and the first main body 331 by the glue for fixedly connecting them together. Of course, the retaining member 35 also may fixedly connect the light guide plate 31 and the first main body 331 by other ways, such as soldering, which are not one by one listed here.

In this embodiment, the first back plate 33 and the second back plate 34 forms a sliding connection. Please refer to FIGS. 3 and 4, the first through hole 333 is corresponding to the second through hole 343, and both the first through hole 333 and the second through hole 343 are strip-shaped.

In the concrete implementation, the backlight module also comprises a connection member (not shown in all FIGS.), which is used to pass through the first through hole 333 and the second through hole 343 for connecting the first main body 331 to the second main body 341.

Preferably, the connection member includes a bolt 36 and a nut 37. The bolt 36 passes through the first through hole 333 and the second through hole 343 to be tightened with the nut 37, thereby connecting the first back plate 33 to the second back plate 34. There forms a recess 38 on the connection position of the first main body 331 and the second main body 341, which is provided for accommodating the bolt 38 or the nut 37. In the embodiment of FIG. 3, the recess 38 is used to accommodate the nut 37.

In the concrete implementation, the connection member also may be other connection structures, which can ensure that the first back plate 33 and the second back plate 34 are connected together and can slide relative to each other. So they are not one by one listed here.

In this embodiment, because both the first through hole 333 and the second through hole are strip-shaped, there exists a sliding space (not shown in all FIGS) between the first back plate 33 and the second back plate 34. The first back plate 33 and the second back plate 34 may relatively slide within the sliding space.

In the concrete implementation, the first back plate 33 and the second back plate 34 also may realize to relatively slide by means of other structures. For example, the second main body 341 is provided with a sliding groove, and the first main body 331 is provided with a slidable rod, so that there forms a sliding connection by the engagement of the slidable rod and the sliding groove. When the slidable rod slides in the sliding groove, the first back plate 33 and the second back plate 34 may relatively slide.

Figure 4:
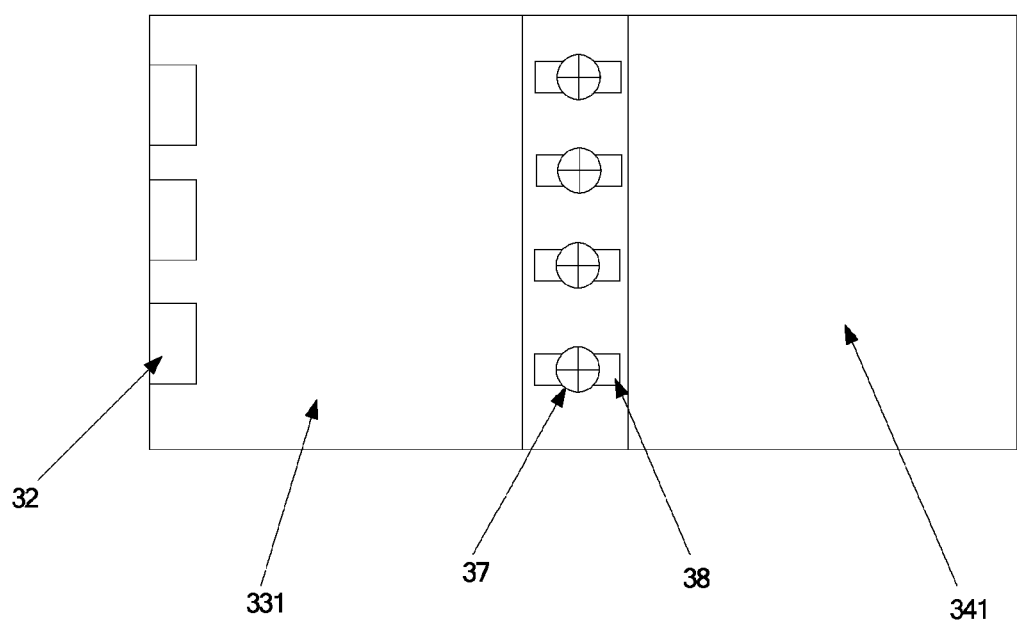
FIG. 4 is a top view of a preferred embodiment of a first back plate and a second back plate connected together of the backlight module of the present invention.

The working principle of the preferred embodiment of the backlight module of the present invention is as follows:

Please refer to FIGS. 3 and 4, when the heat generated by the light source 32 during the course of emitting light is transmitted to the light guide plate 31, the light guide plate 31 will expand with heat. Now the light guide plate 31 is close to the inner side of the second bending portion 342, the light guide plate 31 is fixedly connected to the first back plate 33, and the first back plate 33 and the second back plate 34 are slidably connected together. After expanding with heat, the light guide plate 31 contacts the second bending portion 342 and pushes the second back plate 34 to make the first and second back plates 33, 34 relatively slide, thereby efficiently avoiding to produce an interaction force between the light guide plate 31 and the second bending portion 342, avoiding the bending deformation or the cracking of the light guide plate 31 and ensuring the image displaying quality.

Moreover, in this embodiment, because the light guide plate 31 contacts the light source 32, all the lights emitted by the light source 32 can enter into the light guide plate 31 thereby greatly enhancing the light use efficiency of the backlight module and improving the image displaying quality of the liquid crystal display.

The present invention also provides a liquid crystal display, which comprises a liquid crystal display panel. The liquid crystal display also comprises the backlight module (shown in FIG. 3) provided by the present invention. The liquid crystal display panel is disposed above the backlight module. The light coming out from the backlight module can enter into the liquid crystal display panel. Because the backlight module has been described in above, it is no more repeated here.

In conclusion, although the present invention has been disclosed by above preferred embodiments, above preferred embodiments are not used to limit the present invention. One of ordinary skills in the art also can make all sorts of improvements and amendments within the principles of the present invention. Therefore, the protection scope of the present invention should be based on the scope defined by the appended claims.

What is claimed is:

1. A backlight module, comprising a light guide plate and a light source, the light guide plate including a light incidence surface facing the light source, a light exit surface connected to the light incidence surface and a bottom surface opposite to the light exit surface, the light source including a light-emitting surface, the light emitted by the light source passing through the light incidence surface to enter into the light guide plate, characterized in that:

the backlight module also comprising a first back plate, a second back plate and a retaining member, the first back plate including a first main body and a first bending portion, the second back plate including a second main body and a second bending portion, and the first bending portion being vertically bent and extending from one end of the first main body;

the light guide plate being fixedly connected to the first main body by the retaining member, the light source being mounted on an inner side of the first bending portion, the light-emitting surface of the light source being in contact with the light incidence surface of the light guide plate, and another surface of the light guide plate opposite to the light incidence surface being close to an inner side of the second bending portion;

Wherein when the light guide plate expands with heat, the expanded light guide plate contacts with the second bending portion and directly pushes the second bending portion to make the second back plate sliding relative to the first back plate with a connection member fixing the first main body on the second main body, both respectively facing two left-and-right parts of the bottom surface of the light guide plate and being slidably on each other.

2. The backlight module as claimed in claim 1, characterized in that: the first main body is provided with a first through hole, the second main body being provided with a second through hole, the first and second through holes being slip-shaped, and the first through hole being corresponding to the second through hole; and the connection member passes through the first through hole and the second through hole to connect the first main body and the second main body.

3. The backlight module as claimed in claim 2, characterized in that: the connection member includes a bolt and a nut, and the bolt passing through the first through hole and the second through hole to be tightened with the nut.

4. The backlight module as claimed in claim 3, characterized in that: there forms a recess on a connection position of the first main body and the second main body, and the recess being used to accommodate the bolt or the nut.

5. The backlight module as claimed in claim 1, characterized in that: the retaining member is coated with a glue, and the retaining member being fixedly connected to the light guide plate and the first main body by the glue.

6. The backlight module as claimed in claim 1, characterized in that: the second bending portion is vertically bent and extends from one end of the second main body.

7. A backlight module, comprising a light guide plate and a light source, the light guide plate including a light incidence surface facing the light source, a light exit surface connected to the light incidence surface and a bottom surface opposite to the light exit surface, the light source including a light-emitting surface, the light emitted by the light source passing through the light incidence surface to enter into the light guide plate, characterized in that:

the backlight module also comprising a first back plate and a second back plate, the first back plate including a first main body and a first bending portion, the second back plate including a second main body and a second bending portion; and the light guide plate being fixedly connected to the first main body, the light source being mounted on an inner side of the first bending portion, the light-emitting surface of the light source being in contact with the light incidence surface of the light guide plate, and another surface of the light guide plate opposite to the light incidence surface being close to an inner side of the second bending portion;

Wherein when the light guide plate expands with heat, the expanded light guide plate contacts with the second bending portion and directly pushes the second bending portion to make the second back plate sliding relative to the first back plate with a connection member fixing the first main body on the second main body, both respectively facing two left-and-right parts of the bottom surface of the light guide plate and being slidably on each other.

8. The backlight module as claimed in claim 7, characterized in that: the first main body is provided with a first through hole, the second main body being provided with a second through hole, the first and second through holes being slip-shaped, and the first through hole being corresponding to the second through hole; and the connection member passes through the first through hole and the second through hole to connect the first main body and the second main body.

9. The backlight module as claimed in claim 8, characterized in that: the connection member includes a bolt and a nut, and the bolt passing through the first through hole and the second through hole to be tightened with the nut.

10. The backlight module as claimed in claim 9, characterized in that: there forms a recess on a connection position of the first main body and the second main body, and the recess being used to accommodate the bolt or the nut.

11. The backlight module as claimed in claim 7, characterized in that: the backlight module further comprises a retaining member, which is used to fixedly connect the light guide plate to the first main body.

12. The backlight module as claimed in claim 11, characterized in that: the retaining member is coated with a glue, and the retaining member being fixedly connected to the light guide plate and the first main body by the glue.

13. The backlight module as claimed in claim 7, characterized in that: the first bending portion is vertically bent and extends from one end of the first main body.

14. The backlight module as claimed in claim 7, characterized in that: the second bending portion is vertically bent and extends from one end of the second main body.

15. A liquid crystal display, comprising a liquid crystal display panel, characterized in that: the liquid crystal display further comprising a backlight module, the backlight module comprising a light guide plate and a light source, the light guide plate including a light incidence surface facing the light source, a light exit surface connected to the light incidence surface and a bottom surface opposite to the light exit surface, the light source including a light-emitting surface, the light emitted by the light source passing through the light incidence surface to enter into the light guide plate;

the backlight module also comprising a first back plate and a second back plate, the first back plate including a first main body and a first bending portion, the second back plate including a second main body and a second bending portion; and the light guide plate being fixedly connected to the first main body, the light source being mounted on an inner side of the first bending portion, the light-emitting surface of the light source being in contact with the light incidence surface of the light guide plate, and another surface of the light guide plate opposite to the light incidence surface being close to an inner side of the second bending portion;

Wherein when the light guide plate expands with heat, the expanded light guide plate contacts with the second bending portion and directly pushes the second bending portion to make the second back plate sliding relative to the first back plate with a connection member fixing the first main body on the second main body, both respectively facing two left-and-right parts of the bottom surface of the light guide plate and being slidably on each other.

16. The liquid crystal display as claimed in claim 15, characterized in that: the first bending portion is vertically bent and extends from one end of the first main body, and the second bending portion being vertically bent and extending from one end of the second main body.

* * * * *